April 8, 1969 H. W. FULLER ET AL 3,436,814

METHOD OF FABRICATING MAGNETIC CORE MEMORY PLANES

Filed April 5, 1965 Sheet 1 of 3

INVENTORS
HARRISON W. FULLER
THOMAS LEO McCORMACK
BADRI MUNIR AGHASSI
RICHARD E. MORELY

BY Weingarten, Orenbuch & Lahive
ATTORNEYS

INVENTORS
HARRISON W. FULLER
THOMAS LEO McCORMACK
BADRI MUNIR AGHASSI
RICHARD E. MORELY

BY Weingarten, Orenbuch & Lahive
ATTORNEYS

INVENTORS
HARRISON W. FULLER
THOMAS LEO McCORMACK
BADRI MUNIR AGHASSI
RICHARD E. MORELY
BY
Weingarten, Orenbuch & Lahive
ATTORNEYS 3,436,814

METHOD OF FABRICATING MAGNETIC CORE MEMORY PLANES

Harrison W. Fuller, Needham Heights, Thomas Leo McCormack, Chelmsford, Badri Munir Aghassi, Boston, and Richard E. Morley, Bedford, Mass., assignors, by mesne assignments, to Cambridge Memory Systems, Inc., Framingham, Mass., a corporation of Massachusetts Filed Apr. 5, 1965, Ser. No. 445,343
Int. Cl. H01f 7/06; B41m 3/08; H05k 3/20
U.S. Cl. 29—604 4 Claims

ABSTRACT OF THE DISCLOSURE

A method of fabricating magnetic core memory planes by bonding a Permalloy sheet to a substrate and etching toroids in the Permalloy using photoresist techniques. The substrate includes an electrically conductive sheet separated by an insulator from the toroid and, again using photoresist techniques, electrical conductors are electrodeposited through the opening in the toroid onto the electrically conductive layer and an insulating material is formed as a layer over the toroid elements. A second conducting layer is then bonded over the entire upper surface and both the upper conductive layer and the lower conductive layer are etched to form printed circuit connections.

This invention relates to magnetic core memories and techniques for fabricating them, particularly techniques which lend themselves to the fabrication of core matrices in batches.

Since the early days of electronic digital computers, substantial development effort has been devoted to size and cost reductions which would make practical more elaborate and versatile machines. A significant advance toward this end occurred as a result of the development of magnetic core memories of high storage capacity. Conventionally, such memory devices are made up of miniature toroidal elements or cores which are individually arranged in a matrix. This places a practical lower limit on the size of the cores which can be handled conveniently and the size of the cores in turn has a direct bearing not only on the size and weight of the memory as a whole, but also on the power requirements as well. Then too, the wiring of such small cores is a most delicate operation which does not lend itself well to automated procedures. Hand wiring is, of course, expensive and subject to human error. It follows, therefore, that notwithstanding the relatively advanced nature of magnetic core memories, there remains considerable room for improvements in the way of size and cost reductions.

Thus, a primary object of the present invention is to reduce the cost and bulk of high speed magnetic core memories. Another object is to increase the bit capacity of individual memory planes.

Still another object is to reduce the power requirements of magnetic memories of the above-mentioned character.

A further object is to provide techniques by which such memories can be fabricated with high reliability and reproducibility.

Broadly speaking, the present invention provides a magnetic random access memory plane and a process for fabrication of this plane pursuant to the foregoing objects. The memory plane of this invention employs as storage elements flat Permalloy toroids. Feedthrough conductors and interconnecting conductors are included within the plane in such a pattern that the array of toroids and circuitry forms a coincident current memory system.

Using the process of the invention, the memory plane may be batch fabricated with a high and reproducible manufacturing yield. In this process, a Permalloy sheet is bonded in place over a substrate prior to forming the toroids and the toroids are then subsequently etched on this Permalloy sheet using photoresist techniques. The substrate onto which the Permalloy sheet is bonded includes as one layer an electrically conductive sheet. In subsequent steps, photochemical and electrochemical techniques are used to form feedthrough electrical conductors running through the opening in each toroid in a direction normal to the plane. The toroids are then covered with an insulating medium to which is applied a second electrically conducting layer. Photo-etching techniques are then used to form both the bottom and top conducting layer into electrical conductor patterns which interconnect the feedthroughs in each toroid so that the entire plane constitutes a random access magnetic memory storage system.

Other objects and features of the present invention will become apparent from the following detailed decription when taken in conjunction with the accompanying drawing in which.

Figure 1:
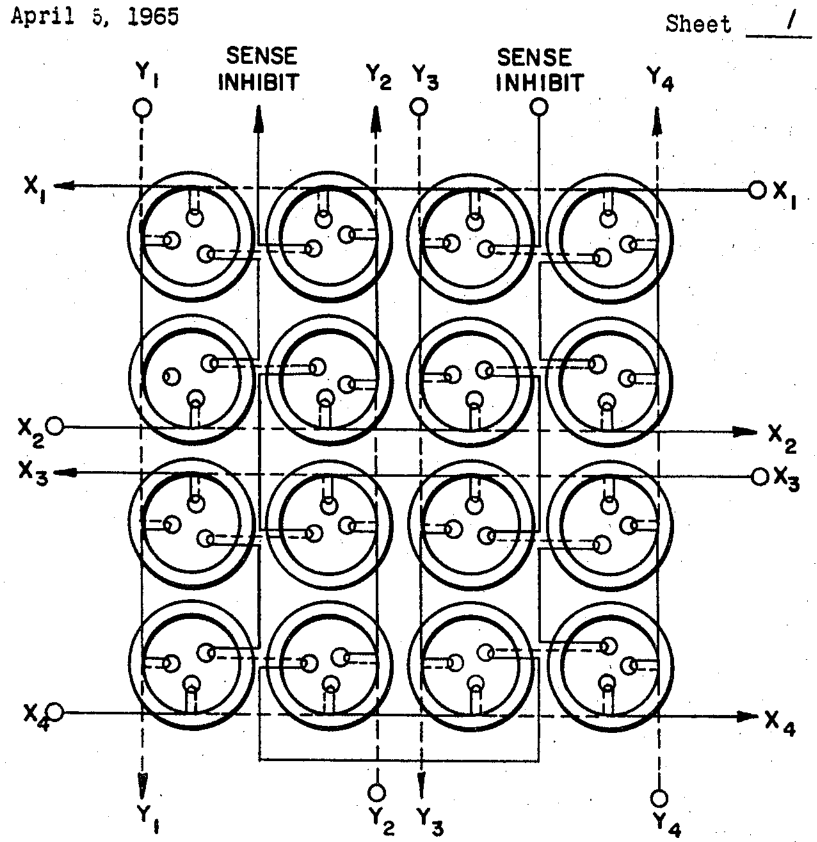
FIG. 1 is a plan view of a matrix of toroids showing the conductor wiring pattern.

Referring now specifically to FIG. 1, there is shown a 4 x 4 matrix of magnetic toroids with an appropriate three conductor wiring pattern for forming a coincident current memory plane. In order to form larger arrays, this same pattern would be reiterated. Each of the toroids has three conductors threaded through it and, in FIG. 1, the solid lines indicate conductor wires in a plane above the plane of the toroids while the dotted lines indicate conducting wires in the plane below the plane of the toroids. As will be explained in more detail below, the layers are arranged such that crossing wires do not cross on the same conductor planes and do not directly contact the Permalloy toroids. The memory plane illustrated in FIG. 1 is, in fact, not a single planar element but rather is formed as a laminate.

The process of fabricating this laminate or multi-layer memory plane involves the use of a temporary substrate as an insulating base, a suitable material being a laminated phenolic plate having a thickness between 1/32 and 1/16 of an inch. A thermo-plastic adhesive is used to bond a thin copper sheet, typically 1.3 mils thick to one side of this temporary substrate. The copper sheet is then coated entirely with a photoresist material. In many instances it may be more convenient to coat not only the copper surface but also the underside of the temporary substrate with the photoresist. A second coating of photoresist is now applied to the same surface only in this second application the photoresist is mixed with a powder plasticizer. A sheet of Permalloy is now bonded by a combination of pressure and heat to the coated copper sheet with the plasticized photoresist serving as the bonding adhesive. A suitable plasticizer for use with photoresist KPR produced by Kodak, has been found to be Chlorowax manufactured by Diamond Alkali Company. This plasticized photoresist has been found to bond well at approximately 400° F.

Figure 2:
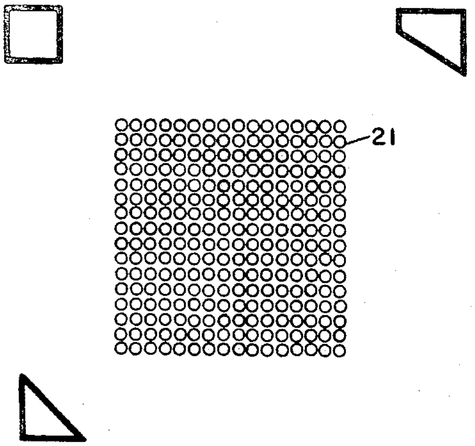
FIG. 2 is a plan view of the negative of an optical mask for photo-etching toroids from a Permalloy sheet.
Figure 4A:
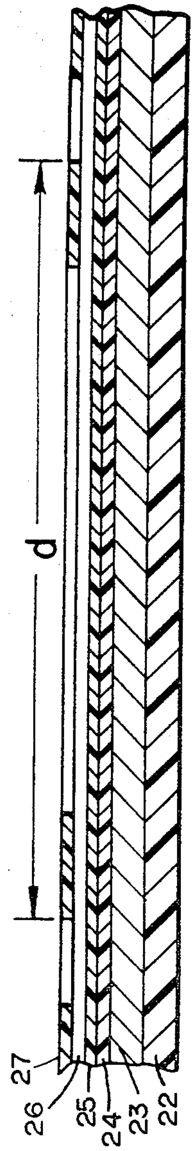
FIG. 4 is a series of cross-sectional views of the memory plane at a number of intermediate steps during the fabrication process.

The sheet of Permalloy bonded in place is now coated on its upper surface with photoresist. This upper coating of photoresist is exposed to light through the mask illustrated in FIG. 2. In FIG. 2 for convenience the pattern is illustrated just the reverse of the actual mask pattern; that is, the dark areas are light transmissive and the white areas are opaque. In this mask the rings 21 correspond to the size and position of the toroids that are to be created in the Permalloy, thereby leaving exposed photoresist material where the toroids are to be formed. The multi-layer element at this stage in the process is illustrated in the cross-sectional view of FIG. 4A. With reference to FIG. 4A, the temporary substrate 22 is shown supporting the copper sheet 23, above which are two coatings 24 and 25 of the photoresist with the upper coating 25 containing plasticizer. To the upper layer 25 of photoresist is adhered the Permalloy sheet 26 which in turn is coated with a topmost layer of photoresist 27. In FIG. 4A, the cross-hatched areas in layer 27 represent the exposed portions of the photoresist corresponding to the toroid legs. The toroid would then have an outer diameter indicated by the dimension *d* in FIG. 4A.

Figure 4B:
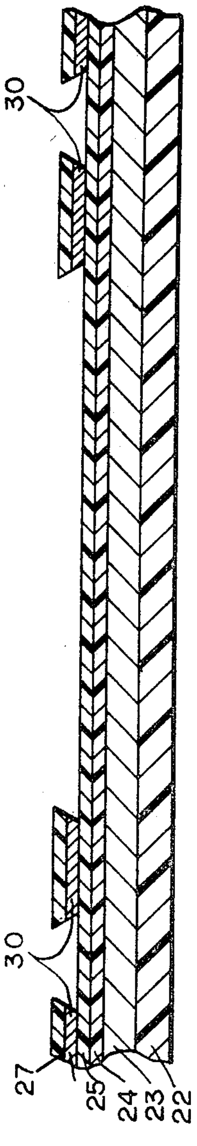

In the next step, the topmost layer of photoresist is developed thereby eliminating the unexposed photoresist and leaving the Permalloy surface with a pattern of exposed photoresist which forms an array of toroids. This surface is next etched with a standard ferric chloride bath which removes all of the exposed Permalloy leaving toroidal-shaped islands 30 of photoresist covered Permalloy on a general surface of unexposed photoresist. This condition is illustrated in FIG. 4B.

The next few steps involve the creation of the feedthrough conductors which are located within the central openings of the toroids and extend in a direction normal to the plane of the toroids.

Figure 3:
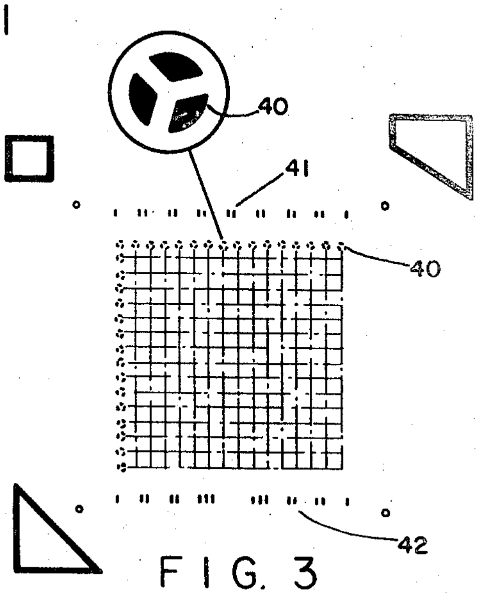
FIG. 3 is a plan view of an optical mask used for exposing insulating material both above and below the plane of the toroids preparatory to electro-forming feedthrough conductors in a direction normal to the toroid plane.
Figure 4C:
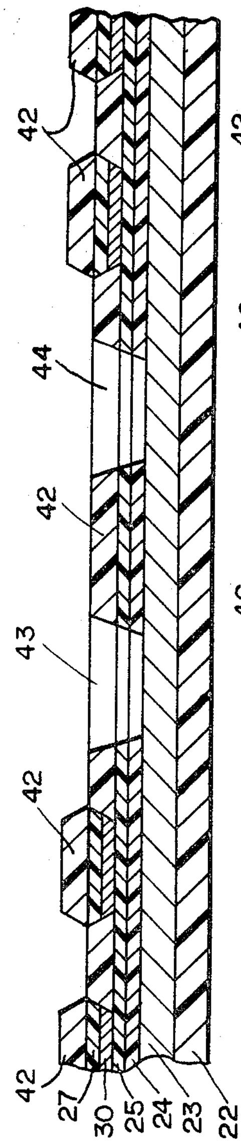

In order to create these conductors, the entire upper surface of the laminated structure is again coated with a photoresist and this layer of photoresist is exposed to light through the optical mask illustrated in FIG. 3. In FIG. 3, all of the clusters are not shown, however, it will be understood that a cluster is located at each matrix intersection. The mask of FIG. 3 is positioned so that each of the clusters of three dots illustrated generally at 40 are centered within a toroidal opening. Each of the dots represents the position of a feedthrough conductor. In addition, in FIG. 3 on two opposing sides of the rectangular array, there are series of dots 41 and 49. As will be described in more detail subsequently, these series of dots 41 and 49 represent the positions of vertical conductors which will be used to complete the circuitry for interconnecting the group of toroidal storage elements. After exposure of the photoresist through the mask illustrated in FIG. 3 there remains within each toroid three areas of unexposed photoresist. This condition is illustrated in FIG. 4C in which the layer 42 is the topmost layer of photoresist and in which the areas designated 43 and 44 represent two of the three unexposed portions of photoresist within the toroid.

Figure 4D:
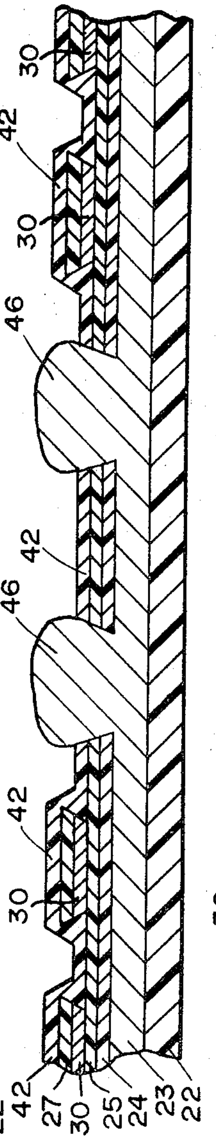
Figure 4E:
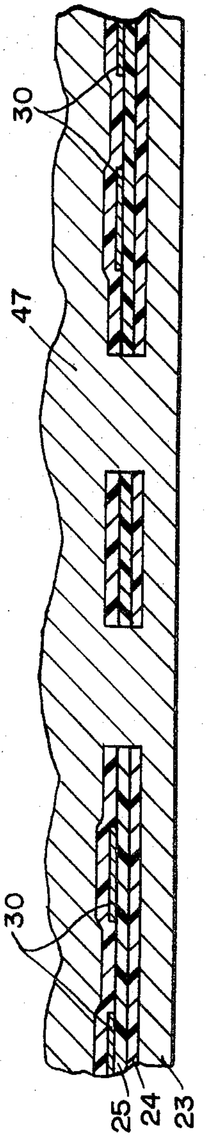

The photoresist is next developed thereby producing holes down to the base copper in those areas where the photoresist was unexposed; that is, in areas corresponding to the cluster of three dots indicated by 40 on FIG. 3, and in areas corresponding to the position of the end vertical conductors 41 and 49. The exposed copper beneath the holes in the photoresist is next electroplated depositing a one mil thickness of copper in each of the holes. The laminated element at this stage in the process is illustrated in FIG. 4D with the nodules of copper 46 shown as integral with the copper sheet 23. Upon completion of this step, a layer of copper 3,000 angstroms thick is evaporated over the complete upper surface. The entire laminated element is then put into an electroplating bath and the upper thickness of copper is increased to 1.3 mils. FIG. 4E illustrates the element at this stage of the process. In FIG. 4E, the upper layer of copper 47 overlays the entire upper surface.

Figure 5:
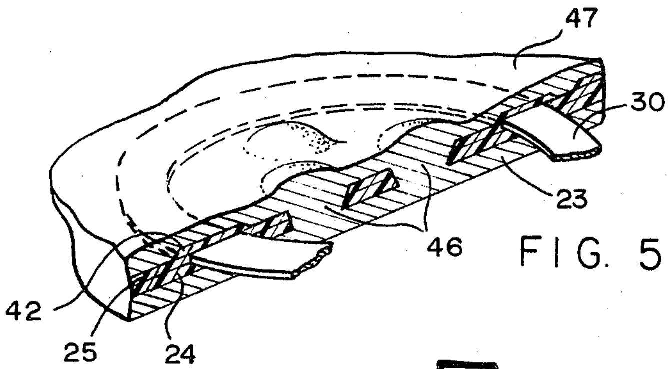
FIG. 5 is a perspective view of a portion of a memory plane as it exists at the intermediate step illustrated in FIG. 4E and having a portion broken away to show more clearly the interrelationship of the layers within the memory plane.

For a clearer understanding of the structure of the element at this stage, reference is made to FIG. 5. In FIG. 5 it should be understood that only a portion of the entire plane corresponding to one toroidal section is shown. The view is a broken away cross-sectional one in order to better illustrate the position of the toroid 30, the feedthrough conductors 46, the lower copper plate 23 and the upper copper coating 47.

Figure 6:
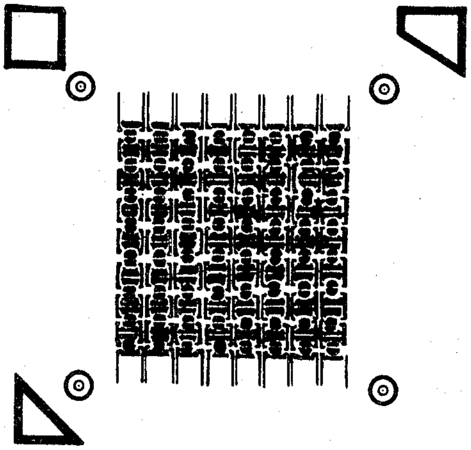
FIG. 6 is a plan view of the negative of an optical mask for use in photo-etching an electrical conductor pattern in the plane at the top of the memory plane.
Figure 7:
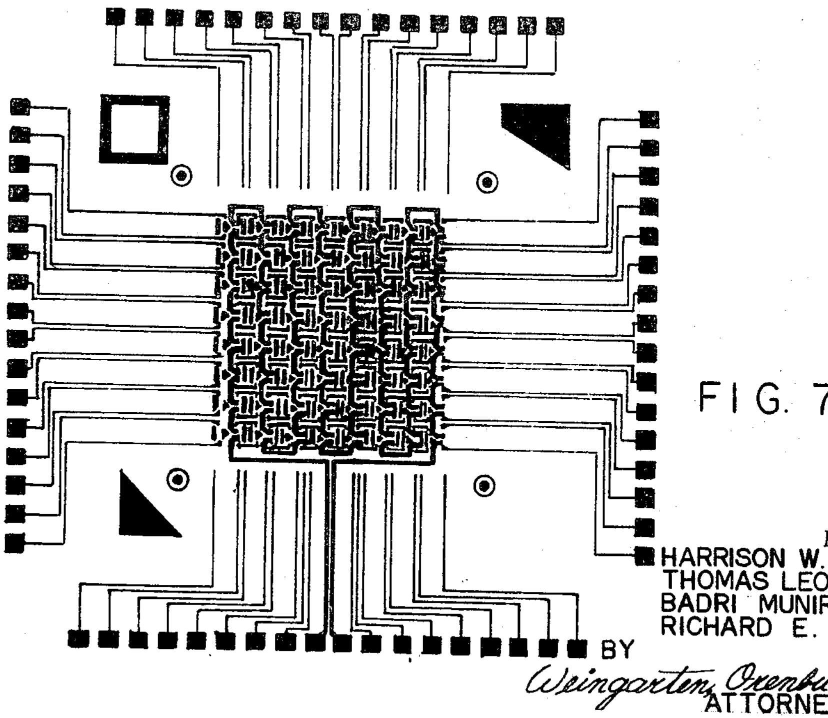
FIG. 7 is a plan view of the negative of the optical mask used for photoetching the electrical conductor on the bottom face of the memory plane.

In the remaining steps of the process the upper (copper) coating 47 and the lower (copper) sheet 23 will be etched to provide a pattern of electrical conductors interconnecting the feedthrough conductors in each toroid so that the group of toroids forms a three conductor random access memory storage plane. In order to produce the conducting pattern on the copper layer 47, this layer is first coated with photoresist. The photoresist is then exposed through an optical mask the negative of which is illustrated in FIG. 6. The photoresist is next developed, dissolving the unexposed areas, and the copper beneath these unexposed areas is then removed by etching, leaving a pattern of conductors. At this point a permanent substrate is affixed to the memory plane by bonding a suitable insulating sheet with a thermoplastic adhesive to this upper surface. The thermoplastic adhesive used to form this bond is selected to have a slightly higher softening point than the adhesive used to bond the temporary substrate to the bottom copper sheet. A suitable thermoplastic adhesive for use in bonding this permanent substrate is a polyester type adhesive having a softening point of 350° F. Thus, if a thermoplastic adhesive of a similar type having a softening point of 300° F. has been used to adhere the temporary substrate, the process of removing the temporary substrate will not affect the bond between the permanent substrate and the upper conductive surface. Accordingly, the temporary substrate is removed from the bottom copper sheet 23 by application of heat at the appropriate temperature and the bottom surface of this bottom copper sheet is now coated with photoresist. This coating of photoresist is then exposed through the negative of the optical mask of the configuration illustrated in FIG. 7 and subsequently developed removing the unexposed photoresist. The copper beneath the unexposed areas of photoresist is then etched away leaving a pattern of electrical conductors on the bottom surface of the planar memory element.

The pattern of electrical conductors selected for both the top conductive layer and the bottom conductive layer of the memory element is arranged so that when in proper registration with the feedthrough conductors in each toroid as well as the vertical connecting conductors (elements 41 and 42 in FIG. 3), the entire array or group of toroids is interconnected electrically to form a random axis coincident current type of three conductor memory organization. In the process each of the optical masks must be carefully registered with respect to the overall planar element. Generally registration marks are made on the bottom copper sheet and each mask thereafter is registered with these marks using a suitable technique, such as pin registration or optical registration.

The process above described provides for batch fabrication techniques exhibiting high precision and reproducibility in an economical production process. The memory storage system produced by these techniques has in addition most of the advantages of memory systems employing ferrite core matrices. The closed flux storage memory elements formed by the Permalloy toroids allow close coupling to wiring and result in low sensitivity to extenral fields. In operation, obviously, suitable electronic drive and sensing circuits are used in conjunction with the memory storage plane of this invention. It is also apparent that memory planes may be stacked vertically and electrically interconnected to form a three dimensional storage element.

The invention having been described, various improvements and modifications will now occur to those skilled in the art. The invention herein is to be construed as limited only by the spirit and scope of the appended claims.

What is claimed is:

1. A method of fabricating a magnetic core memory plane comprising the sequential steps of covering a surface of a first layer of conductive material with a layer of insulating material, forming from magnetic material a planar array of toroidal elements on the exposed surface of said layer of insulating material, with the exposed portion of said toroid having an insulating coating thereon, removing said insulating material from discrete regions of the surface of said conductive material underlying the apertures defined by said toroidal elements, depositing conductive material in said regions to form electrical paths feeding through said toroidal elements to said first layer of conductive material, covering said toroidal elements and the interspaces defining said elements with a second layer of conductive material insulated from said toroidal elements and in contact with said feedthroughs, forming wiring patterns in said first and second layers of conductive material to interconnect selected ones of said feedthroughs and thereby establish electrical paths feeding through selected groups of said toroidal elements.

2. A method of fabricating a magnetic core memory plane comprising the sequential steps of coating at least one surface of a first layer of conductive material with a photoresist material, bonding a sheet of magnetic material to said photoresist coated surface of said conductive material, photochemically forming a planar array of toroidal elements in said sheet of magnetic material with the exposed portions of said toroids having an insulating coating, removing said photoresist material from discrete regions of the surface of said conductive material underlying the apertures defined by said toroidal elements, electrochemically depositing conductive material in said regions to form electrical paths feeding through said toroidal elements to said first layer of conductive material, covering said toroidal elements and the interspaces defining said elements with a second layer of conductive material insulating from said toroidal elements and in contact with said feedthroughs, photochemically forming wiring patterns in said first and second layers of conductive material to interconnect selected ones of said feedthroughs and thereby establish electrical paths feeding through selected groups of said toroidal elements.

3. A method of fabricating a magnetic core memory plane comprising the steps of bonding a conductive sheet to a temporary substrate of insulating material, coating the exposed surface of said conductive sheet with photoresist material, bonding a sheet of magnetic material to said photoresist coated surface of said conductive sheet, photochemically forming a planar array of toroidal elements in said magnetic sheet, coating said toroidal elements and the interspaces defining said elements with photoresist material, removing by exposure and development the photoresist material located in discrete regions above the surface of said conductive material underlying the apertures defined by said toroidal elements, electrochemically depositing conductive material in said regions to form electrical paths feeding through said toroidal elements to said conductive sheet, covering said toroidal elements and the interspaces defining said elements with a second layer of conductive material contacting said feedthroughs but insulated from said toroidal elements by photoresist material, photochemically forming a first wiring pattern in said conductive layer to interconnect selected ones of said feedthroughs and thereby partially establish electrical paths feeding through selected groups of said toroidal elements, bonding a permanent substrate to the exposed surface of said first wiring pattern, removing the temporary substrate from said conductive sheet, photochemically forming a second wiring pattern in said conductive sheet to complete the electrical paths feeding through said selected groups of toroidal elements.

4. The method according to claim 3 wherein said substrates are bonded to said conductive sheet and to said first wiring pattern, respectively, with thermoplastic materials which become plastic at substantially different temperatures.

References Cited

UNITED STATES PATENTS

| | | | |
|---|---|---|---|
| 2,910,673 | 10/1959 | Black | 340—174 |
| 2,934,748 | 4/1960 | Steimen | 340—174 |
| 2,961,745 | 11/1960 | Smith | 29—155.5 |
| 2,985,948 | 5/1961 | Peters | 29—155.5 |
| 2,961,746 | 11/1960 | Lyman | 29—625 |
| 3,142,112 | 7/1964 | Burkig et al. | 29—604 X |
| 3,155,561 | 11/1964 | Rubens et al. | |
| 3,183,579 | 5/1965 | Briggs et al. | 29—604 |
| 3,206,342 | 9/1965 | Briggs | 29—604 |
| 3,206,732 | 9/1965 | Briggs | 29—604 X |
| 3,317,408 | 5/1967 | Barnes et al. | 29—604 |

JOHN F. CAMPBELL, *Primary Examiner.*

D. C. REILEY, *Assistant Examiner.*

U.S. Cl. X.R.

29—625; 156—3; 204—15